US012651175B2

(12) United States Patent
    Kadioglu

(10) Patent No.: US 12,651,175 B2
(45) Date of Patent: Jun. 9, 2026

(54) DIGITAL CONTENT CLASSIFICATION AND RECOMMENDATION USING CONSTRAINT-BASED PREDICTIVE MACHINE LEARNING

(71) Applicant: FMR LLC, Boston, MA (US)

(72) Inventor: Serdar Kadioglu, Somerville, MA (US)

(73) Assignee: FMR LLC, Boston, MA (US)

( * ) Notice: Subject to any disclaimer, the term of this patent is extended or adjusted under 35 U.S.C. 154(b) by 750 days.

(21) Appl. No.: 18/093,591

(22) Filed: Jan. 5, 2023

(65) Prior Publication Data

US 2024/0232652 A1 Jul. 11, 2024

(51) Int. Cl.
    *G06N 5/022* (2023.01)
(52) U.S. Cl.
    CPC .................................... *G06N 5/022* (2013.01)
(58) Field of Classification Search
    CPC ...................................................... G06N 5/022
    See application file for complete search history.

(56) References Cited

U.S. PATENT DOCUMENTS

| | | |
|---|---|---|
| 10,915,336 B1 | 2/2021 | Ding et al. |
| 11,232,357 B2 | 1/2022 | Dalli et al. |

| | | | |
|---|---|---|---|
| 2021/0142196 A1* | 5/2021 | R ........................... | G06F 16/258 |
| 2021/0304285 A1 | 9/2021 | Alahmady | |
| 2022/0083614 A1* | 3/2022 | Ushanov ............. | G06F 16/9535 |
| 2022/0107872 A1* | 4/2022 | Kondrashkin ...... | G06F 18/2113 |
| 2022/0215285 A1 | 7/2022 | Daly et al. | |
| 2023/0030341 A1* | 2/2023 | Koh ...................... | G06F 40/186 |

* cited by examiner

*Primary Examiner* — Mahelet Shiberou
(74) *Attorney, Agent, or Firm* — Cesari and McKenna, LLP

(57) ABSTRACT

Methods and apparatuses are described for digital content classification and recommendation using constraint-based predictive machine learning. A server trains a machine learning (ML) recommendation model to generate digital content layouts each comprising digital content item slots arranged according to one or more digital content selection constraints. The server receives user profile information for a first user. The server executes the trained ML recommendation model to generate a plurality of digital content item displays, each including a selected digital content item placed in each slot. The server determines, for each digital content item display, an interaction prediction score for each digital content item in the display. The server selects a digital content item display based upon the interaction predictions scores. The server transmits the selected digital content item display to a client device.

20 Claims, 7 Drawing Sheets

100

100

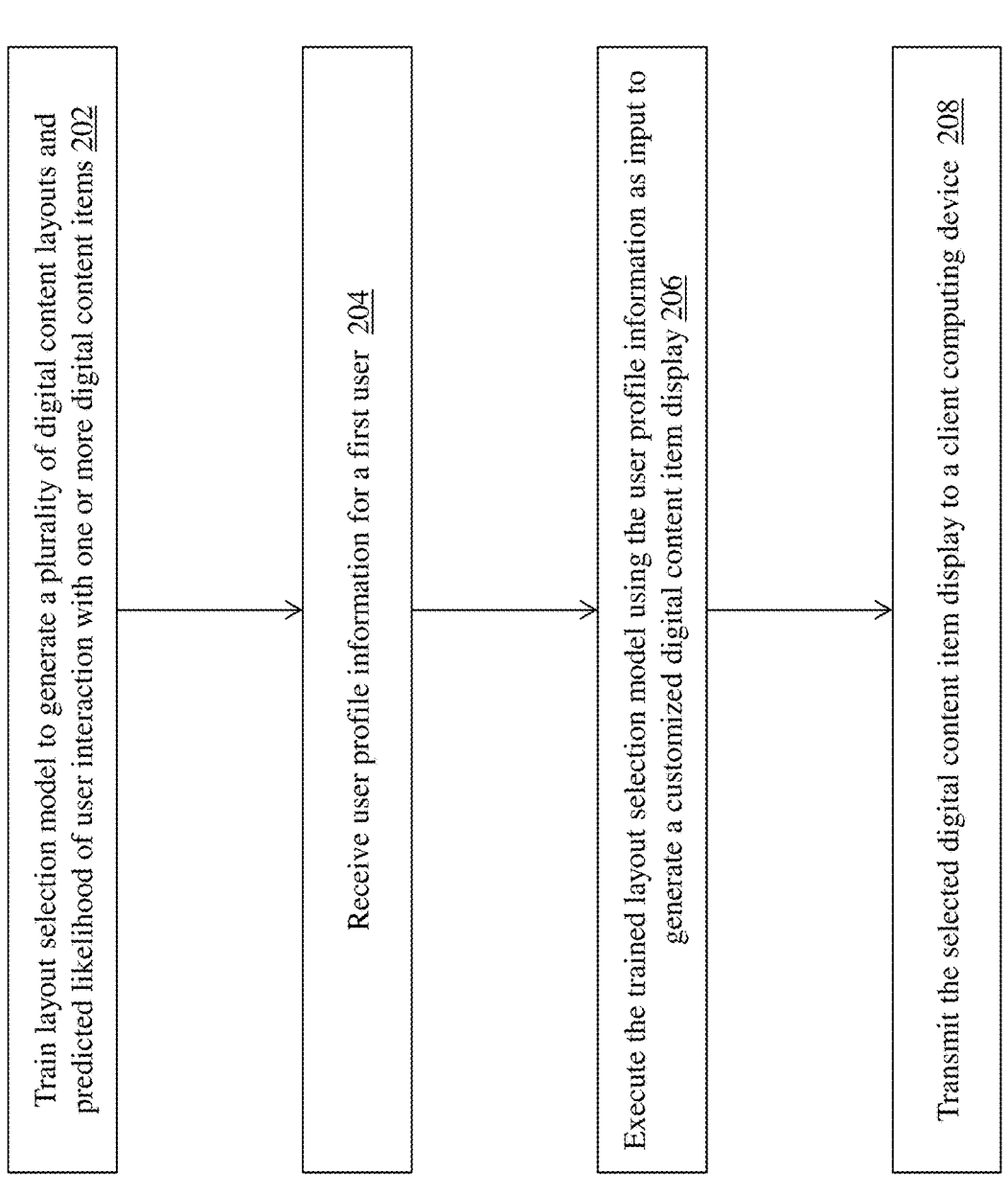

Train layout selection model to generate a plurality of digital content layouts and predicted likelihood of user interaction with one or more digital content items 202

Receive user profile information for a first user 204

Execute the trained layout selection model using the user profile information as input to generate a customized digital content item display 206

Transmit the selected digital content item display to a client computing device 208

Figure 4B:
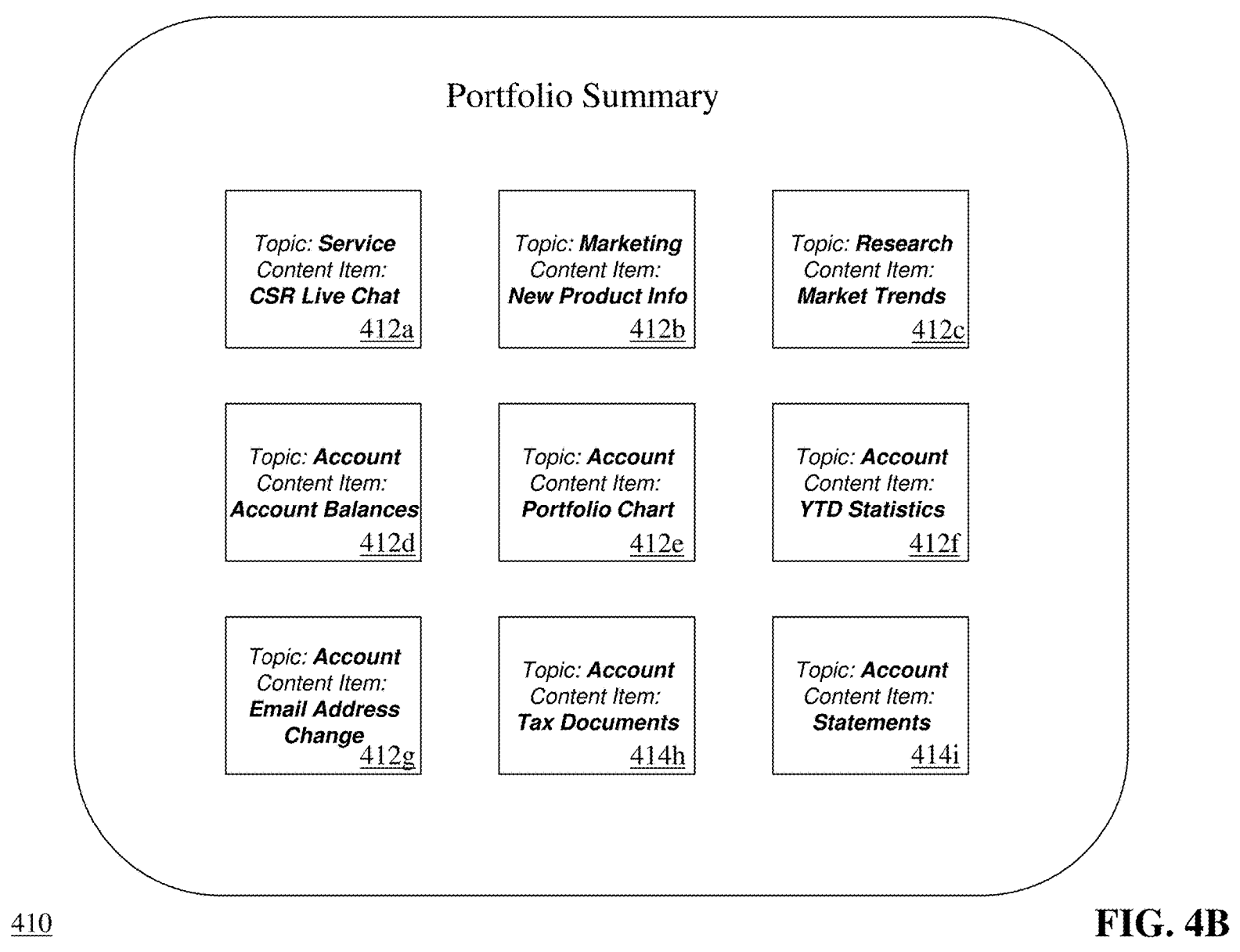

Portfolio Summary

Topic: *Service*
Content Item:
*CSR Live Chat*
<u>412a</u>

Topic: *Marketing*
Content Item:
*New Product Info*
<u>412b</u>

Topic: *Research*
Content Item:
*Market Trends*
<u>412c</u>

Topic: *Account*
Content Item:
*Account Balances*
<u>412d</u>

Topic: *Account*
Content Item:
*Portfolio Chart*
<u>412e</u>

Topic: *Account*
Content Item:
*YTD Statistics*
<u>412f</u>

Topic: *Account*
Content Item:
*Email Address
Change*
<u>412g</u>

Topic: *Account*
Content Item:
*Tax Documents*
<u>414h</u>

Topic: *Account*
Content Item:
*Statements*
<u>414i</u>

Figure 5B:
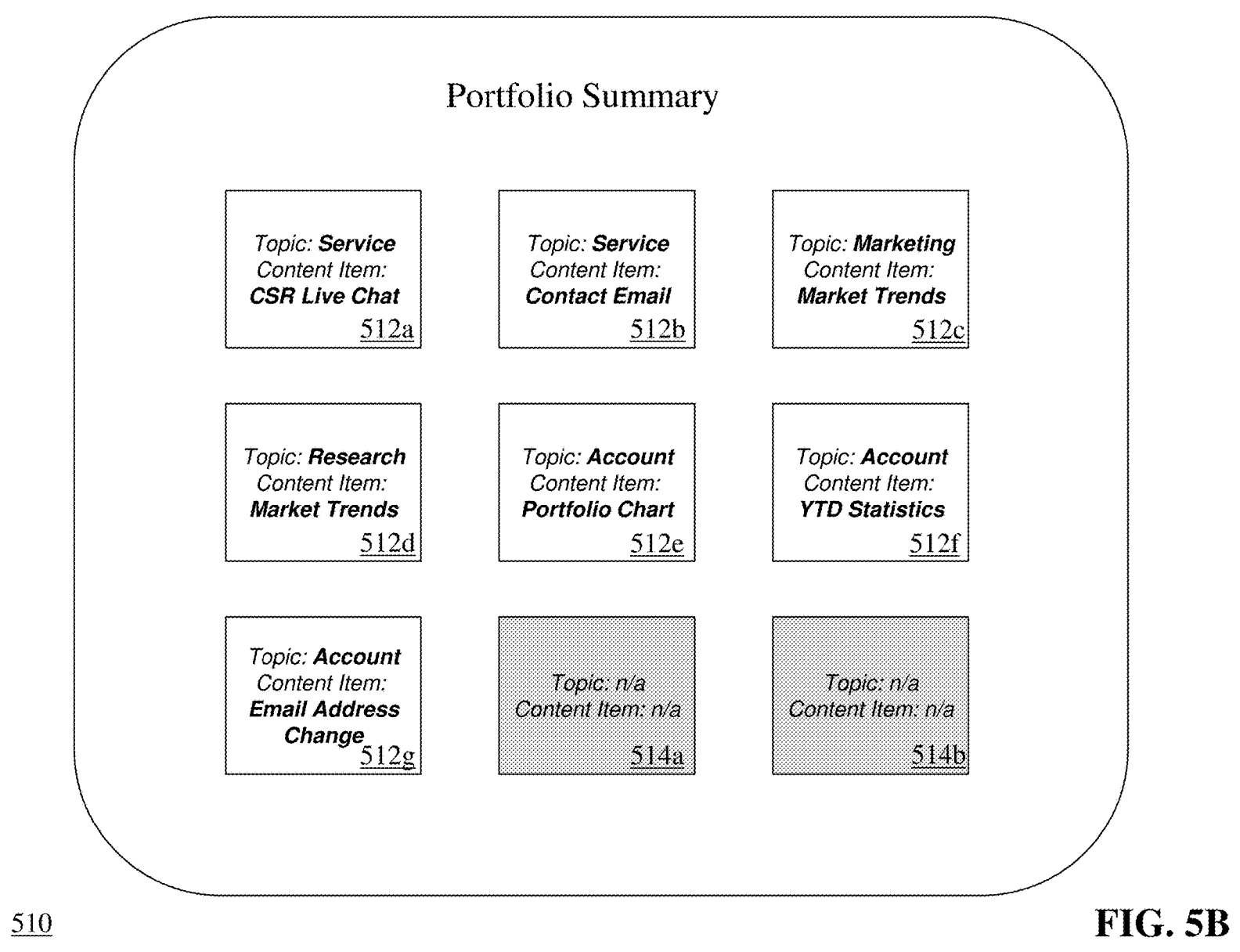

Portfolio Summary

*Topic:* Service
*Content Item:*
CSR Live Chat
512a

*Topic:* Service
*Content Item:*
Contact Email
512b

*Topic:* Marketing
*Content Item:*
Market Trends
512c

*Topic:* Research
*Content Item:*
Market Trends
512d

*Topic:* Account
*Content Item:*
Portfolio Chart
512e

*Topic:* Account
*Content Item:*
YTD Statistics
512f

*Topic:* Account
*Content Item:*
Email Address Change
512g

*Topic: n/a*
*Content Item: n/a*
514a

*Topic: n/a*
*Content Item: n/a*
514b

DIGITAL CONTENT CLASSIFICATION AND RECOMMENDATION USING CONSTRAINT-BASED PREDICTIVE MACHINE LEARNING

TECHNICAL FIELD

This application relates generally to methods and apparatuses, including computer program products, for digital content classification and recommendation using constraint-based predictive machine learning.

BACKGROUND

As computing devices such as smartphones, smart televisions, and tablets have become the preferred way for many consumers to interact with digital content items like web pages, content providers and other entities have become interested in generating content recommendations that are tailored to each particular end user's interests and preferences, as well as to predict content items that will be of interest to the end user and/or solicit an interaction (e.g., a click) from the end user. A traditional way of generating such recommendations are through the use of predictive recommender systems, that analyze historical end user behavior to generate predictions of digital content that is likely to be of interest to certain end users in the future. Organizations may also desire to impose specific parameters, preferences, and constraints on the selection of digital content items to be displayed to one or more end users. For example, a digital content item display may be configured to include a certain number of digital content items from each of one or more topic areas. To accomplish this, prescriptive rulesets and/or programming logic is used to configure the digital content item display.

These prescriptive elements frequently sit on top of the underlying machine learning (ML)-based recommendation engine in existing systems and are not integrated into the operation of the recommender model in generating predictive output. The resulting digital recommendations are often subpar because the recommender system cannot generate an output that aligns with the prescriptive rulesets or logic imposed on the recommender. In addition, the architectural design of such systems is typically comprised of complex individual layers that are not easy to analyze from a diagnostic point of view. This makes it difficult to determine whether a given recommendation was selected due to the ML modeling or the prescriptive logic.

SUMMARY

Therefore, what is needed are methods and systems that utilize a synergistic approach to predictive and prescriptive modeling in the context of content recommendation. The techniques described herein beneficially provide an orchestrated modeling paradigm that melds the prescriptive and predictive aspects of the recommendation decision pipeline to generate digital content recommendations and layouts that satisfy desired content selection constraints and preferences while also optimizing the likelihood of user interaction with the displayed digital content. In addition, the systems and methods described herein simplify the modeling architecture by removing ad-hoc prescriptive logic layers and instead integrating the reasoning model into the recommendation learning model.

The invention, in one aspect, features a system for digital content classification and recommendation using constraint-based predictive machine learning. The system includes a computer data store comprising (i) a plurality of digital content items, each digital content item associated with a topic of a plurality of topics, (ii) user profile information for each of a plurality of users, (iii) historical user interaction information for each the plurality of users; and (iv) historical user content recommendation information for each of the plurality of users. The system includes a server computing device in communication with the computer data store and comprising a memory that stores computer-executable instructions and a processor that executes the computer-executable instructions. The server computing device trains a machine learning (ML) recommendation model to generate a plurality of digital content layouts each comprising a plurality of digital content item slots arranged according to one or more digital content selection constraints, where the ML recommendation model is trained based on the user profile information, historical user interaction information, and the historical user content recommendation information. The server computing device receives user profile information for a first user from the computer data store. The server computing device executes the trained ML recommendation model using as input the user profile information, the plurality of digital content layouts, and the plurality of digital content items to generate a plurality of digital content item displays, each including a selected digital content item placed in each slot. The server computing device determines, for each digital content item display, an interaction prediction score for each digital content item in the display. The server computing device selects a digital content item display based upon the interaction predictions scores. The server computing device transmits the selected digital content item display to a client computing device.

The invention, in another aspect, features a computerized method of digital content classification and recommendation using constraint-based predictive machine learning. A computer data store stores (i) a plurality of digital content items, each digital content item associated with a topic of a plurality of topics, (ii) user profile information for each of a plurality of users, (iii) historical user interaction information for each the plurality of users; and (iv) historical user content recommendation information for each of the plurality of users. A server computing device in communication with the computer data store trains a machine learning (ML) recommendation model to generate a plurality of digital content layouts each comprising a plurality of digital content item slots arranged according to one or more digital content selection constraints, where the ML recommendation model is trained based on the user profile information, historical user interaction information, and the historical user content recommendation information. The server computing device receives user profile information for a first user from the computer data store. The server computing device executes the trained ML recommendation model using as input the user profile information, the plurality of digital content layouts, and the plurality of digital content items to generate a plurality of digital content item displays, each including a selected digital content item placed in each slot. The server computing device determines, for each digital content item display, an interaction prediction score for each digital content item in the display. The server computing device selects a digital content item display based upon the interaction predictions scores. The server computing device transmits the selected digital content item display to a client computing device.

The invention, in another aspect, features a system for digital content classification and recommendation using constraint-based predictive machine learning. The system comprises a server computing device having a memory that stores computer-executable instructions and a processor that executes the computer-executable instructions. The server computing device trains a machine learning (ML) recommendation model to generate a plurality of digital content layouts each comprising a plurality of digital content item slots arranged according to one or more digital content selection constraints, where the ML recommendation model is trained based on user profile information for each of a plurality of users, historical user interaction information for each the plurality of users, and historical user content recommendation information for each of the plurality of users. The server computing device receives user profile information for a first user. The server computing device executes the trained ML recommendation model using as input the user profile information, the plurality of digital content layouts, and a plurality of digital content items to generate a plurality of digital content item displays, each including a selected digital content item placed in each slot based upon a topic assigned to the slot. The server computing device determines, for each digital content item display, an interaction prediction score for each digital content item in the display. The server computing device selects a digital content item display based upon the interaction predictions scores. The server computing device transmits the selected digital content item display to a client computing device.

The invention, in another aspect, features a computerized method of digital content classification and recommendation using constraint-based predictive machine learning. A server computing device trains a machine learning (ML) recommendation model to generate a plurality of digital content layouts each comprising a plurality of digital content item slots arranged according to one or more digital content selection constraints, where the ML recommendation model is trained based on user profile information for each of a plurality of users, historical user interaction information for each the plurality of users, and historical user content recommendation information for each of the plurality of users. The server computing device receives user profile information for a first user. The server computing device executes the trained ML recommendation model using as input the user profile information, the plurality of digital content layouts, and a plurality of digital content items to generate a plurality of digital content item displays, each including a selected digital content item placed in each slot based upon a topic assigned to the slot. The server computing device determines, for each digital content item display, an interaction prediction score for each digital content item in the display. The server computing device selects a digital content item display based upon the interaction predictions scores. The server computing device transmits the selected digital content item display to a client computing device.

Any of the above aspects can include one or more of the following features. In some embodiments, the plurality of digital content items comprise one or more of text articles, content cards, or website messages. In some embodiments, each digital content item slot in the digital content layout is assigned to a topic. In some embodiments, the digital content selection constraints comprise a maximum number of digital content items selected for one or more topics, a maximum number of digital content items available for each topic, a maximum number of selected topics, and a ranking of selected topics.

In some embodiments, the interaction prediction score for each digital content item corresponds to a likelihood of a user interaction with the digital content item. In some embodiments, the user interaction with the digital content item comprises a click on the digital content item.

In some embodiments, upon transmitting the selected digital content item display to the client computing device, the server computing device updates the historical user content recommendation information in the computer data store based upon the digital content items in the selected digital content item display. In some embodiments, the server computing device receives indicia of an interaction with one of the digital content items in the digital content item display at the client computing device and updates the historical user interaction information in the computer data store based upon the indicia. In some embodiments, the server computing device retrains the trained ML recommendation model based upon the updated historical user content recommendation information and the updated historical user interaction information. In some embodiments, the server computing device receives the digital content selection constraints from a user of a remote computing device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is a flow diagram of a computerized method of digital content classification and recommendation using constraint-based predictive machine learning.

FIG. 4B is a diagram of an exemplary digital content item display generated by server computing device using the parameters of FIG. 4A.

FIG. 5B is a diagram of an exemplary digital content item display generated by server computing device using the parameters of FIG. 5A.

DETAILED DESCRIPTION

Figure 1:
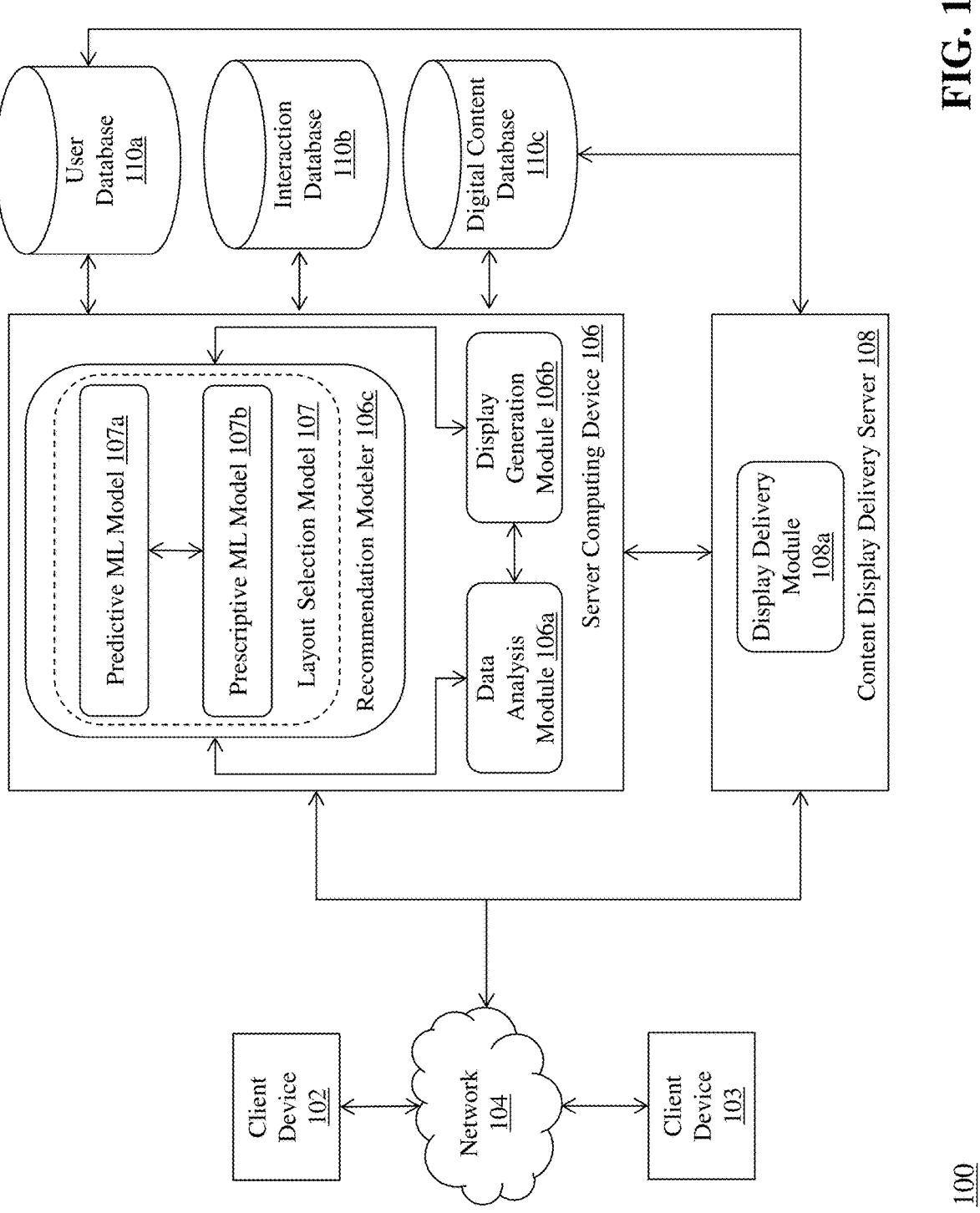
FIG. 1 is a block diagram of a system for digital content classification and recommendation using constraint-based predictive machine learning.

FIG. 1 is a block diagram of system 100 for digital content classification and recommendation using constraint-based predictive machine learning. System 100 includes client computing device 102, client computing device 103, communication network 104, server computing device 106 that includes data analysis module 106a, display generation module 106b, recommendation modeler 106c with predictive machine learning (ML) model 107a and prescriptive ML model 107b (collectively, layout selection model 107), content display delivery server computing device 108 with display delivery module 108a, and a plurality of databases—user database 110a, interaction database 110b and digital content database 110c.

Client computing devices 102, 103 connect to communication network 104 in order to communicate with server computing device 106 and content display delivery server 108 to provide input and receive output relating to the process of digital content classification and recommendation using constraint-based predictive machine learning as described herein. In some embodiments, client computing devices 102, 103 are each coupled to an associated display device (not shown). For example, client computing devices 102, 103 can provide a graphical user interface (GUI) via the display device that is configured to receive input from a user of the device 102, 103 and to present output (e.g., digital content items and/or displays of digital content items) to the user that results from the methods and systems described herein.

Exemplary client computing devices 102, 103 include but are not limited to desktop computers, laptop computers, tablets, mobile devices, smartphones, virtual assistant devices, and Internet-of-Things (IoT) devices, and internet appliances. It should be appreciated that other types of computing devices that are capable of connecting to the components of system 100 can be used without departing from the scope of invention. Although FIG. 1 depicts two client computing devices 102, 103, it should be appreciated that system 100 can include any number of client computing devices.

Communication network 104 enables client computing devices 102, 103 to communicate with server computing device 106 and content display delivery server 108. Network 104 is typically a wide area network, such as the Internet and/or a cellular network. In some embodiments, network 104 is comprised of several discrete networks and/or subnetworks (e.g., cellular to Internet) arranged to provide one or more logical network paths from client computing devices 102, 103 to server computing device 106 and content display delivery server 108.

Server computing device 106 is a device including specialized hardware and/or software modules that execute on a processor and interact with memory modules of server computing device 106, to receive data from other components of system 100, transmit data to other components of system 100, and perform functions for digital content classification and recommendation using constraint-based predictive machine learning as described herein. Server computing device 106 includes data analysis module 106a, display generation module 106b, and recommendation modeler 106c with predictive ML model 107a and prescriptive ML model 107b (collectively, layout selection model 107) that execute on one or more processors of server computing device 106. In some embodiments, modules 106a, 106b, 106c and models 107a, 107b are specialized sets of computer software instructions programmed onto one or more dedicated processors in server computing device 106 and can include specifically-designated memory locations and/or registers for executing the specialized computer software instructions.

Although the modules 106a, 106b, 106c and models 107a, 107b are shown in FIG. 1 as executing within the same server computing device 106, in some embodiments the functionality of modules 106a, 106b, 106c and models 107a, 107b can be distributed among a plurality of server computing devices. As shown in FIG. 1, server computing device 106 enables the modules 106a, 106b, 106c and models 107a, 107b to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of modules 106a, 106b, 106c and models 107a, 107b is described in detail throughout the specification.

As shown in FIG. 1, layout selection model 107 comprises predictive ML model 107a and prescriptive ML model 107b. In some embodiments, predictive ML model 107a comprises a recommendation model that predicts the likelihood of a user interaction (e.g., click) with a given digital content display item based upon data about the user and item(s), i.e., P(Click|user, item). Exemplary recommendation models can be based upon algorithms such as (but not limited to) clustering models, K-nearest neighbors, neural networks, matrix factorization, and/or Bayesian networks. Recommendation modeler 106c can train predictive ML model 107a using a combination of historical user demographic data retrieved from user database 110a, historical content item interaction data retrieved from interaction database 110b, and historical content item data retrieved from digital content database 110c. In some embodiments, predictive ML model 107a can predict a likelihood of a user interaction with a given digital content item display (i.e., an overall likelihood that a given user will interact with at least one digital content item in the display). In one example, the overall likelihood can be an aggregation of the individual predictions for each digital content item in a given display.

In some embodiments, prescriptive ML model 107b comprises a reinforcement learning-based model that generates a plurality of digital content item display layouts (also called digital content layouts) based upon one or more constraints and/or preferences received as input. As one example, a digital content layout can comprise a 3×3 grid of slots (also called cells) that each contain a digital content item. The digital content layout is transformed into a digital content item display (e.g., a visual representation) that is displayed to a user of client computing device(s) 102, 103. Prescriptive AI model 107b can generate a plurality of digital content layouts (e.g., different 3×3 arrangements of slots containing content items) according to one or more constraints or preferences provided as input to model 107b. For example, model 107b can receive input such as: upper bound and/or lower bound on particular content item topics, priorities for selecting certain content items and/or topics, and requirements for diversity of content items. Based upon the input, model 107b is configured to generate digital content layouts that meet the constraints or preferences.

Advantageously, recommendation modeler 106c orchestrates models 107a and 107b to generate and select a digital content layout for a given user that has a highest predicted likelihood of a user interaction while also satisfying the desired constraints and preferences for the content items displayed. Further details on the operation of modeler 106c and models 107a, 107b to generate and select a digital content layout is provided throughout the specification.

Content display delivery server 108 is a computing device (or set of computing devices) to which client computing devices 102, 103 can connect to retrieve and display digital content item displays (such as web pages). Generally, a digital content item display comprises a plurality of digital content items (such as articles, links, images, advertisements, alerts, etc.) arranged in a layout according to one or more digital content selection constraints. Content display delivery server 108 is a combination of hardware, including one or more special-purpose processors and one or more physical memory modules, and specialized software modules (such as content delivery module 108a) that are executed by one or more processors of content display delivery server 108. In some embodiments, content display delivery server 108 is an online content platform that provides certain digital content items and digital content item displays via a content delivery network and/or website. As can be appreciated, a website comprises a plurality of visual and non-visual elements that make up the content transmitted and displayed to a user when, e.g., browser software on client computing devices 102, 103 connects to content display delivery server 108 via communication network 104 (e.g., Internet) and requests content from server 108. The elements of a website include, but are not limited to, webpages (e.g., HTML documents), image files, layouts, color sets, stylesheets, document object models (DOM), tracking elements, metadata, URLs, and content (e.g., text, audio, video).

Databases 110a-110c are located on a computing device (or in some embodiments, on a set of computing devices) coupled to server computing device 106 and content display delivery server 108 and databases 110a-110c are configured to receive, generate, and store specific segments of data relating to the process of digital content classification and recommendation using constraint-based predictive machine learning as described herein. In some embodiments, all or a portion of databases 110a-110c can be integrated with server computing device 106, content display delivery server 108, or be located on a separate computing device or devices. Databases 110a-110c can comprise one or more databases configured to store portions of data used by the other components of system 100, as will be described in greater detail below In some embodiments, user database 110a comprises user profile information for a plurality of users of system 100; typically, each user is associated with one or more client computing devices 102, 103. The user profile information can include, but is not limited to, user financial information/user demographic information, when a digital content item was presented to the user, historical user interaction data relating to digital content items presented to the user (e.g., clickstream URL data, ratings, feedback, etc.), and historical user digital content item consumption information (e.g., which digital content items has the user viewed/interacted with in the past).

In some embodiments, interaction database 110b comprises a historical list of events relating to a user's interaction with one or more digital content item displays and/or associated digital content items—e.g., data associated with an indication of how the user responded to a particular digital content item when the content item was presented to the user. As an example, for each event and corresponding digital content item, interaction database 110b can store data such as a identifier for the digital content item, an identifier of the user and/or client computing device 102, 103 on which the digital content item was presented, a timestamp of when the digital content item was presented, and a response from the user and/or client computing device 102, 103 with respect to the digital content item (e.g., click, view time, scroll time, etc.) In some embodiments, digital content database 110c comprises data, files, metadata, and other information corresponding to digital content items and digital content item displays (e.g., links, files, images, text and other content used to generate content items for display to an end user).

FIG. 2 is a computerized method 200 of digital content classification and recommendation using constraint-based predictive machine learning, using system 100 of FIG. 1. In step 202, recommendation modeler 106c trains layout selection model 107 (comprised of predictive ML model 107a and prescriptive ML model 107b) using historical user demographic data retrieved from user database 110a, historical content item interaction data retrieved from interaction database 110b, and historical content item data retrieved from digital content database 110c to generate a plurality of digital content layouts. The training phase for predictive ML model 107a can comprise generating a training data set by retrieving historical data relating to user interactions with digital content layouts and/or specific digital content items—for example, modeler 106c can determine whether users interacted with a given digital content item or did not interact with it (also called an outcome), as well as the demographic data for the users and information about each content item. Then, after labeling the user-content item data based upon the outcome, modeler 106c can train predictive ML model 107a to predict the likelihood that a future user will interact with a given content item.

Prescriptive ML model 107b is configured according to defined objectives and constraints (e.g., the limits and preferences for topics and/or digital content items to be displayed in a digital content layout). For example, an organization may want each digital content item display to include a defined number of topics from which digital content items can be selected for display. In another example, the organization may want a specified distribution of digital content items in each digital content layout. Therefore, model 107b is configured according to these defined objectives and constraints when model 107 generates candidate digital content layouts.

Using the example of a 3×3 digital content layout, prescriptive ML model 107b is configured as follows:

1) Structure/Data—the structural attributes of model 107b are defined according to a set of configuration parameters that relate to the number of digital content items (also called cells) that are displayed in the layout as well as the topics that are included in the layout:

a) cells $C \in \{1, \ldots, 9\}$—in a 3×3 layout, there are nine cells displayed. For other layouts, the number of cells can be determined based upon, e.g., top_k algorithm.

b) topics $T \in \{A, B, C, D\}$—in this example, there are four topics A, B, C, D from which the displayed digital content items are selected. In some embodiments, the topics are sorted according to, e.g., organization preference, likelihood of interaction, or another metric.

c) ub_of_topic=[1, 2, 1, 9]—each value corresponds to the upper bound (ub) (or maximum number) of digital content items to display for each topic. For example, a layout will include a maximum of one (1) digital content item for topic A, a maximum of two (2) digital content items for topic B, a maximum of one (1) digital content item for topic C, and a maximum of nine (9) digital content items for topic D.

d) num_item_of_topic=[5, 4, 0, 5]—each value corresponds to the number of digital content items that are currently available to display for each topic. For example, there are five (5) digital content items available for topic A, four (4) digital content items available for topic B, zero (0) digital content items available for topic C, and five (5) digital content items for topic D.

e) items I∈ {0, . . . , sum(num_item_of_topic)}—in this example, the set of items that can be selected for display in a digital content layout. In some embodiments, the set of items I is sorted by topic according to one of a plurality of different sorting methodologies, such as by maximum likelihood of interaction. In some embodiments, it may be useful to sort the set of items/for exploration purposes (e.g., either by likelihood of interaction+upper confidence bound (UCB), or in purely random order) in order to gain information about whether users interact with a given digital content item or not. This information can then be used to re-train predictive ML model 107a for future execution.

f) num_items_before_topic=[0, 5, 9, 9]—each value corresponds to the maximum number of digital content items to appear before the first digital content item for the associated topic. For example, a maximum of zero (0) digital content items should appear before the first digital content item for topic A, a maximum of five (5) digital content items (from topic A) should appear before the first digital content item for topic B, a maximum of nine (9) digital content items (from topics A and/or B) should appear before the first digital content item for topic C, and a maximum of nine (9) digital content items (from topics A, B, and/or C) should appear before the first digital content item for topic D.

2) Variables—there are a plurality of variables configured for model 107b associated with the topics and digital content items for display. In some embodiments, these variables can be adjusted by a remote user prior to execution of layout selection model 107 in order to generate digital content layouts with desired features (as will be described in greater detail later in the specification).

g) topic_of_cell[c]∈ {0, . . . , T−1}∀$_c$∈C
  h) item_of_cell[c]∈ {0, . . . , I−1}∀$_c$∈C
  i) count_of_topic[t]∈ {0, . . . , I−1}∀$_c$∈C 3) Constraints—in addition, model 107b is configured with a plurality of constraints on the digital content items that can be displayed in a digital content layout:

j) Link topics and items—the selection of a digital content item for display in each cell is constrained by the configuration of topics for the layout as described above in Structure/Data. An exemplary formula is as follows:

$$\forall_c \in C,$$

$$lb = \text{num\_items\_before\_topic}[\text{topic\_of\_cell}[c]] \le \text{item\_of\_cell}[c] < ub =$$

$$lb + \text{num\_item\_of\_topic}[\text{topic\_of\_cell}[c]]$$

where lb is the lower bound of digital content items for the topic and ub is the upper bound of digital content items for the topic.

k) Distribution of topics—the distribution of digital content items in a content layout is guided by the count of digital content items included for each topic:

distribute (count_of_topic, [0, . . . , T−1], topic_of_cell)

l) Different content items—the digital content layout is constrained to include all different content items (i.e., no duplicates):

all_different(item_of_cell)

4) Search Heuristic—in some embodiments, model 107b is configured with search heuristics to enable efficient selection of digital content items for inclusion in a layout:

m) Variable_ordering:

| Cell 1 | | Cell 2 | | Cell 3 | | . . . | Cell C | |
|--------|------|--------|------|--------|------|-------|--------|------|
| topic$_c$ | item$_c$ | topic$_c$ | item$_c$ | topic$_c$ | item$_c$ | . . . . . . | topic$_c$ | item$_c$ | n) Value_ordering→minimum_index_first

Additional details regarding Variable Ordering and Value Ordering are described in (i) Barbara M. Smith, "A Tutorial on Constraint Programming," University of Leeds, School of Computer Studies, Research Report Series, Report 95.14, April 1995; and (ii) Gilles Pesant, "A constraint programming primer," EURO J Comput Optim (2014) 2:89-97, DOI 10.1007/s13675-014-0026-3, Springer; each of which is incorporated herein by reference.

A typical example of static variable ordering is to assign variables in a fixed order, e.g., variable_1 to variable_n. Likewise, a static value heuristic is to always assign the minimum value available in the domain of a variable.

Contrarily, a typical example of a dynamic heuristic is "assign most constrained variable to the least constraining value". Notice we do not necessarily know what those variables/values might be apriori. These dynamic decisions depend on each step as the search for solutions progresses when making variable-value assignments.

Once models 107a and 107b are configured and trained as described above, system 100 can utilize the trained models 107a, 107b in an execution phase to dynamically generate digital content displays for users, where the generated displays comprise digital content items that are both predicted to have a high likelihood of interaction from the user and also meet desired content and/or business constraints and objectives.

A user at client computing device 102, 103 establishes a connection to content display delivery server 108. In one example, the user at client computing device 102, 103 can launch a browser application and transmit a connection request to server 108 via HTTP for the purpose of accessing a software application provided by server 108. In some embodiments, the connection request includes access credentials (e.g., login, password) in order to receive application functionality from server 108. Server 108 can use the access credentials to retrieve user profile information from user database 110a, which includes user demographic information, user account information and product information, user permissions, user device information, contact information, and so forth. As part of this process, server 108 can communicate with server computing device 106 to generate a digital content item display for transmission to and presentation on client computing device 102, 103. As an example, the digital content item display can be a web page (or a portion of a web page) displayed in a browser application as part of the software application provided to client computing device 102, 103.

Data analysis module 106a of server computing device 106 receives (step 204) user profile information from content display delivery server 108. In some embodiments, data analysis module 106a can retrieve the user profile information from user database 110a by referencing the user access credentials, instead of server 108. In some embodiments, data analysis module 106a can convert the user profile information into a format that is readable and/or ingestible by recommendation modeler 106c. For example, data analysis module 106a can be configured to transform the user profile information (which may be stored as alphanumeric data, such as text strings) into encoded data such as vectors, tensors, and/or matrices (e.g., numeric representations of the user profile information) that can be used by models 107a, 107b as input to generate the corresponding output.

Once the user profile information is provided to recommendation modeler 106c as input, modeler 106c executes (step 206) trained layout selection model 107 using the user profile information as input to generate a customized digital content item display for the user of client computing device 102, 103. Generally, prescriptive ML model 107b is considered a "reasoning" model—i.e., a model that deals with the problem structure to satisfy constraints and preferences. In some embodiments, prescriptive ML model 107b is trained to generate a plurality of digital content layouts that satisfy defined business constraints and objectives. In the example where the digital content layout is a 3×3 grid, model 107b generates a plurality of candidate layouts that satisfy constraints such as upper bounds and/or lower bounds on a number of topics in the layout, a priority of topics and/or digital content items in the layout, arrangement of topics and/or digital content items in the layout, a diversity of different topics or digital content items in the layout, etc. Model 107b is indifferent among feasible solutions; model 107b does not consider which solutions are optimal in view of a particular user's interaction history and/or which solutions are more likely to produce an interaction from a given user.

Predictive ML model 107a is considered a "learning" model—i.e., a model that guides the selection of a digital content layout from the plurality of layouts generated by prescriptive ML model 107b. For instance, among all possible digital content layouts generated by model 107b, the output from model 107a informs the selection of a digital content layout that is predicted to produce a highest likelihood of interactions from a given user. Model 107a achieves this result by extending prescriptive model 107b with suitable variable and value heuristics that yield preferred solution(s).

Advantageously, recommendation modeler 106c can orchestrate the execution of models 107a and 107b in order to efficiently generate the preferred digital content layout(s) for a user. In some embodiments, predictive ML model 107a and prescriptive ML model 107b are executed in parallel—e.g., prescriptive ML model 107a generates a plurality of candidate layouts that satisfy identified constraints and predictive ML model 107b identifies one or more digital content items that are associated with a high likelihood of user interaction. Recommendation modeler 106c can integrate the output from each model 107a, 107b together to generate customized digital content item displays that satisfy particular constraints and also optimize a likelihood of user interaction. In some embodiments, recommendation modeler 106c can sort, rank, filter, or perform other types of classification to organize the candidate layouts into a preferred list or identify a subset of candidate layouts that should be preferred for display to a user. For example, the output of models 107a and 107b can be used to score each of the candidate layouts according to a likelihood of interaction with digital content items in the layout, where layouts with a higher score indicate that a given user is more likely to click on at least one digital content item in the layout. Other approaches and/or sequences of execution of models 107a, 107b (e.g., in a defines sequence or series) can be contemplated within the scope of the technology described herein.

After determining a preferred digital content layout and associated digital content items to be included in the layout, recommendation modeler 106c provides the digital content layout and associated digital content items to display generation module 106b. Display generation module 106b generates (step 206) a customized digital content item display using the digital content layout and associated digital content items. In some embodiments, display generation module 106b determines which digital content items have been selected for inclusion in the digital content item display and retrieves those digital content items from, e.g., digital content database 110c. Using the layout information from modeler 106c, display generation module 106b generates a visual representation of the digital content layout for display on client device 102, 103. For example, digital content items can be images, links, or other types of content and display generation module 106b can generate structured data (e.g., XML, HTML) that arranges the digital content items in the visual representation according to the defined structure of the layout.

Figure 3:
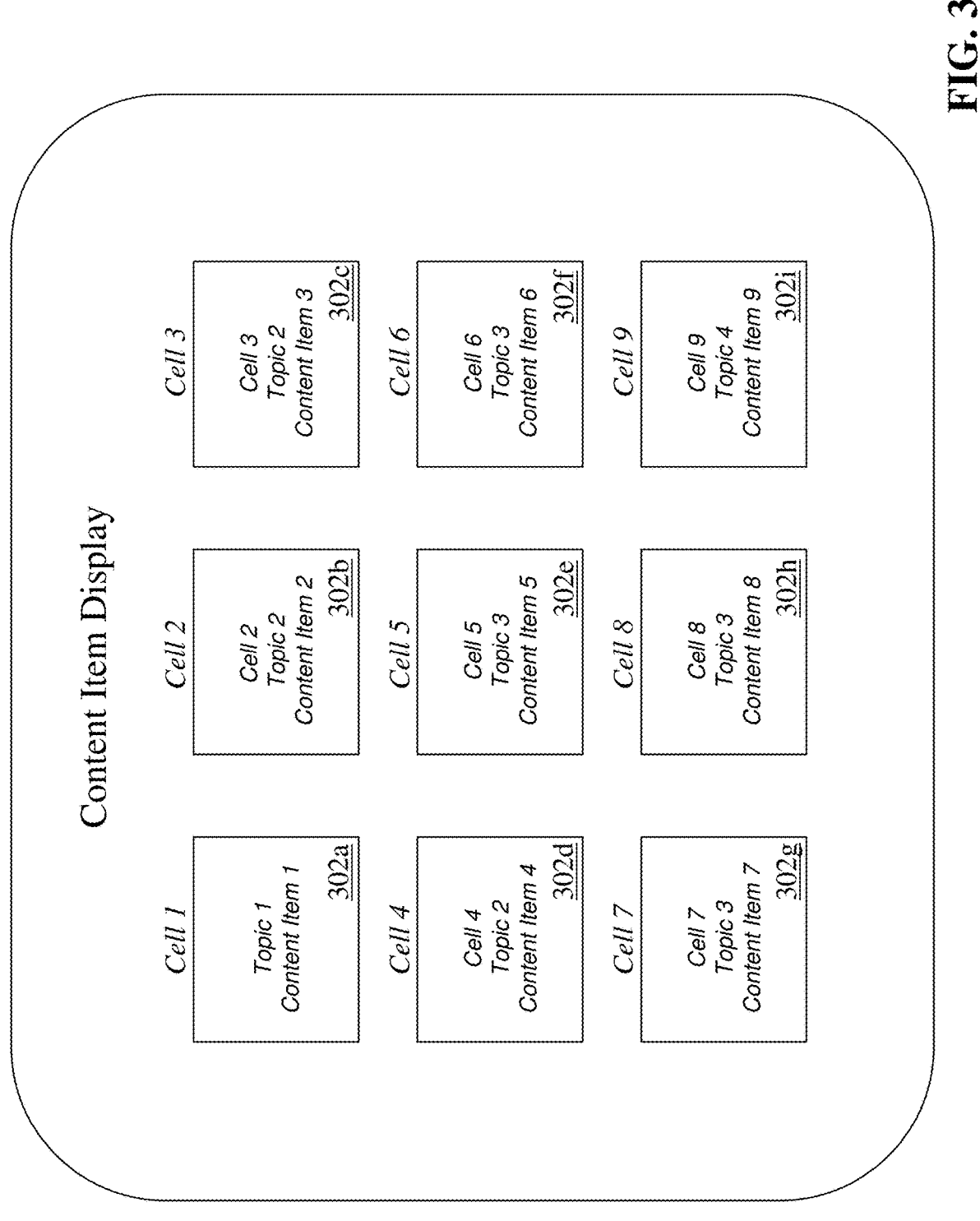
FIG. 3 is a diagram of an exemplary digital content item display user interface generated by server computing device.

Once module 106b has generated the digital content item display, module 106b transmits (step 208) the display and any accompanying metadata or files to display delivery module 108a of convent display delivery server 108, which forwards the display to client device 102, 103 for presentation to a user via a screen or other type of user interface device. FIG. 3 is a diagram of an exemplary digital content item display user interface 300 generated by server computing device 106. As shown in FIG. 3, the user interface 300 comprises a 3×3 display of content items 302a-302i, arranged by topic. A user of client device 102, 103 can interact with one or more of the content items (e.g., click, tap, hover, etc.) and client device 102, 103 can transmit corresponding user input to content display delivery server 108, which takes appropriate action (e.g., displaying additional content, redirecting client device 102, 103 to another server or website, etc.).

Figure 4A:
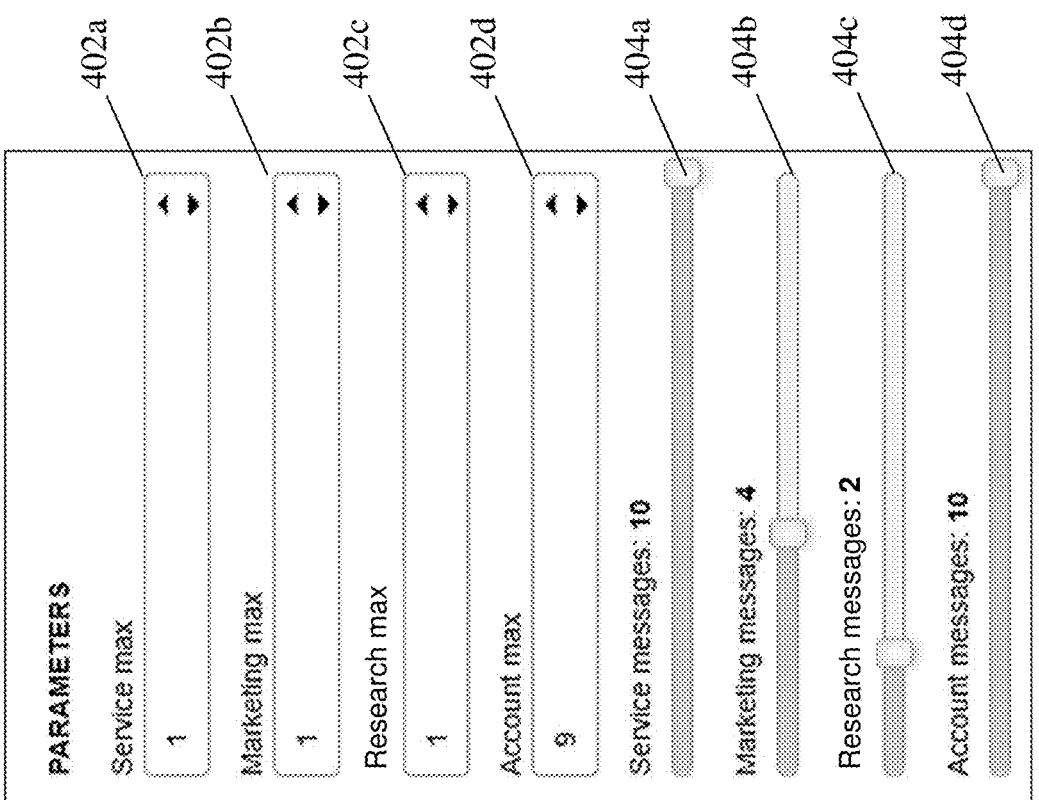
FIG. 4A is a diagram of a first exemplary user interface for identification of parameters for topics and digital content items used to generate digital content item displays.

As mentioned above, a user (e.g., developer, system administrator) can configure the selection, preferences, and constraints of topics and/or digital content items to be displayed, and the user's input is applied by recommendation modeler 106c to configure prescriptive ML model 107b for generation of digital content item displays. FIG. 4A is a diagram of an exemplary user interface 400 for identification of parameters for topics and digital content items used to generate digital content item displays. As shown in FIG. 4A, the user interface 400 includes a plurality of input boxes 402a-402d each associated with a different topic (e.g., "Service", "Marketing", "Research", "Account"). Each input box 402a-402d contains a number which indicates the maximum number of digital content items to be included in a digital content layout for the corresponding topic. For example, the user has specified that layouts generated by server computing device 106 will contain a maximum of one (1) digital content item classified in the Service topic, a maximum of one (1) digital content item classified in the Marketing topic, a maximum of one (1) digital content item classified in the Research topic, and a maximum of nine (9) digital content items classified in the Account topic.

The user interface 400 also includes a plurality of sliders 404a-404d each associated with one of the topics. Each slider 404a-404d has a value which indicates the number of digital content items (i.e., "messages") that are available to be selected for inclusion in a layout. For example, the Service topic has ten (10) available content items, the Marketing topic has four (4) available content items, the Research topic has two (2) available content items, and the Account topic has ten (10) available content items. As can be appreciated, the configuration shown in FIG. 4A is ideal, because for each topic there are more digital content items available for inclusion than the maximum number of content items allowed. As such, server computing device 106 will be able to generate a digital content item display that fully satisfies the constraints and preferences. FIG. 4B is a diagram of an exemplary digital content item display 410 generated by server computing device 106 using the parameters of FIG. 4A. As shown in FIG. 4B, display 410 includes a plurality of content items 412a-412i arranged in a 3×3 layout. Each content item 412a-412i has a corresponding topic and the topics selected conform to the parameters defined by the user in FIG. 4A.

Figure 5A:
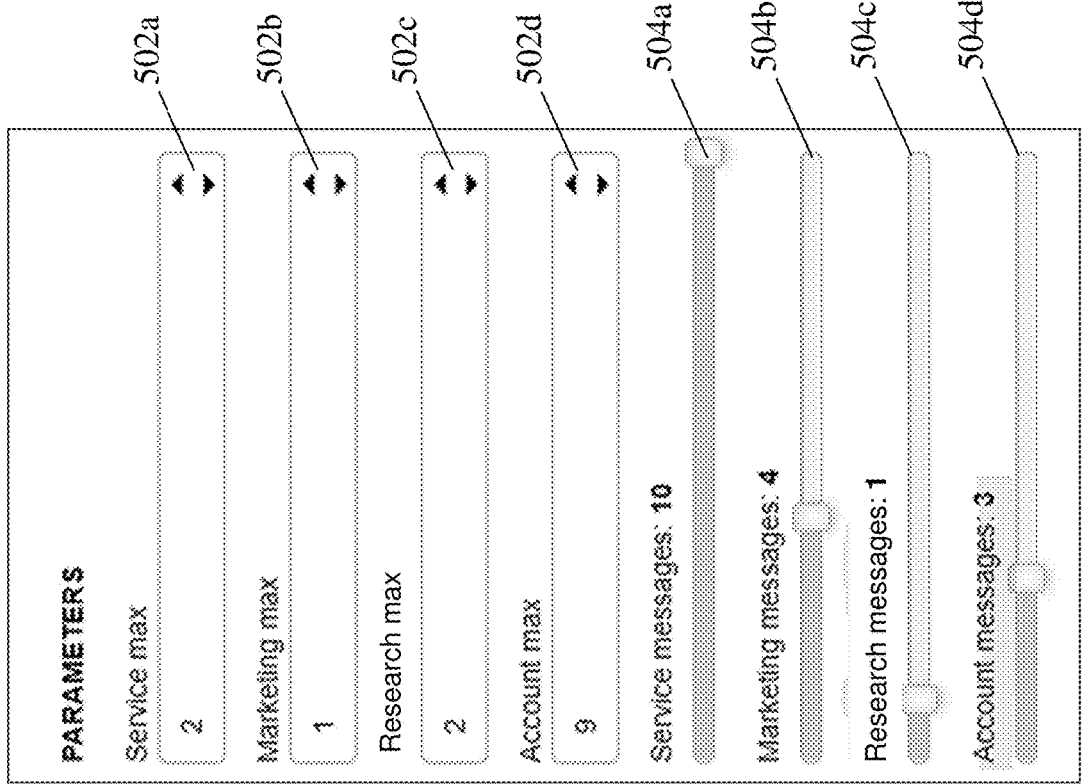
FIG. 5A is a diagram of a second exemplary user interface for identification of parameters for topics and digital content items used to generate digital content item displays.

As can be appreciated, in some embodiments there may not be a suitable number of content items available for a given topic to satisfy the parameters specified by a user. FIG. 5A is a diagram of an exemplary user interface 500 for identification of parameters for topics and digital content items used to generate digital content item displays. As shown in FIG. 5A, the user interface 500 includes a plurality of input boxes 502a-502d each associated with a different topic (e.g., "Service", "Marketing", "Research". "Account"). Each input box 502a-502d contains a number which indicates the maximum number of digital content items to be included in a digital content layout for the corresponding topic. For example, the user has specified that layouts generated by server computing device 106 will contain a maximum of two (2) digital content items classified in the Service topic, a maximum of one (1) digital content item classified in the Marketing topic, a maximum of two (2) digital content item classified in the Research topic, and a maximum of nine (9) digital content items classified in the Account topic.

The user interface 500 also includes a plurality of sliders 504a-504d each associated with one of the topics. Each slider 504a-504d has a value which indicates the number of digital content items (i.e., "messages") that are available to be selected for inclusion in a layout. For example, the Service topic has ten (10) available content items, the Marketing topic has four (4) available content items, the Research topic has one (1) available content item, and the Account topic has three (3) available content items. As can be appreciated, the configuration shown in FIG. 5A has a maximum number of digital content items selected for each of the Research and Account topics that is greater than the number of available digital content items for those topics. As such, server computing device 106 is able to generate a digital content item display that only partially satisfies the constraints and preferences. FIG. 5B is a diagram of an exemplary digital content item display 510 generated by server computing device 106 using the parameters of FIG. 5A. As shown in FIG. 5B, display 510 includes a plurality of content items 512a-512g arranged in a 3×3 layout. Each content item 512a-512g has a corresponding topic and the topics selected conform to the parameters defined by the user in FIG. 5A. Due to the lack of available messages, two of the cells 514a and 514b do not contain a digital content item. In some embodiments, these cells 514a and 514b are blank or not displayed in the user interface 510.

Generally, from a Business/Reasoning standpoint, content and display generation module 106b can decide the ordering of topics in each cell based on business rules. As one running example, a business rule might be that a Service cell should appear before a Marketing cell. Then, the static ordering of cells from 1 to n realizes the preference of the business rule. This is how module 106b is configured to respect business constraints/preferences.

From the Recommendation/Machine Learning standpoint, content and display generation module 106b can base the ordering of items within each cell based on the predicted likelihood of relevance for each user generated according to the recommendations of a machine learning personalization model. In our running example, while a Service cell appears before a Marketing cell, within Service items and Marketing items, the most relevant item is shown to the user. Effectively, the variable ordering ensures Business reasoning, and the value ordering ensures the personalization/learning/recommendations within those Business rules.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for digital content classification and recommendation using constraint-based predictive machine learning, the system comprising:

a computer data store comprising (i) a plurality of digital content items, each digital content item associated with a topic of a plurality of topics, (ii) user profile information for each of a plurality of users, (iii) historical user interaction information for each the plurality of users; and (iv) historical user content recommendation information for each of the plurality of users;

a server computing device in communication with the computer data store and comprising a memory for storing computer-executable instructions and a processor that executes the computer-executable instructions to:

train a layout selection model comprising (i) a prescriptive machine learning (ML) model that generates a plurality of digital content layouts each comprising a plurality of digital content item slots arranged according to one or more digital content selection constraints and (ii) a predictive ML model that generates a predicted likelihood of user interaction with one or more of the plurality of digital content items, wherein the predictive ML model is trained based on the historical user interaction information and the historical user content recommendation information;

receive user profile information for a first user from the computer data store;

execute the trained layout selection model using as input the user profile information to generate a customized digital content item display for the user, each customized digital content item display comprising a selected one of the plurality of digital content layouts generated by the prescriptive ML model with a selected digital content item placed in each slot, wherein the selected digital content items are associated with a maximum interaction prediction score for the first user generated by the predictive ML model, wherein the trained layout selection model executes the prescriptive ML model to generate the plurality of digital layouts while executing the predictive ML model in parallel to generate the interaction prediction scores for the plurality of digital content items, and the trained layout selection model integrates the separate output from each model together to generate the customized digital content item display for the user; and transmit the customized digital content item display to a client computing device for presentation to the first user.

2. The system of claim 1, wherein the plurality of digital content items comprise one or more of text articles, content cards, or website messages.

3. The system of claim 1, wherein each digital content item slot in the digital content layout is assigned to a topic.

4. The system of claim 1, wherein the digital content selection constraints comprise a maximum number of digital content items selected for one or more topics, a maximum number of digital content items available for each topic, a maximum number of selected topics, and a ranking of selected topics.

5. The system of claim 4, wherein the interaction prediction score for each digital content item corresponds to a likelihood of a user interaction with the digital content item.

6. The system of claim 5, wherein the user interaction with the digital content item comprises a click on the digital content item.

7. The system of claim 1, wherein, upon transmitting the selected digital content item display to the client computing device, the server computing device updates the historical user content recommendation information in the computer data store based upon the digital content items in the selected digital content item display.

8. The system of claim 7, wherein the server computing device receives indicia of an interaction with one of the digital content items in the digital content item display at the client computing device, and updates the historical user interaction information in the computer data store based upon the indicia.

9. The system of claim 8, wherein the server computing device retrains the trained ML recommendation model based upon the updated historical user content recommendation information and the updated historical user interaction information.

10. The system of claim 1, wherein the server computing device receives the digital content selection constraints from a user of a remote computing device.

11. A computerized method of digital content classification and recommendation using constraint-based predictive machine learning, the method comprising:

storing, by a computer data store, (i) a plurality of digital content items, each digital content item associated with a topic of a plurality of topics, (ii) user profile information for each of a plurality of users, (iii) historical user interaction information for each the plurality of users; and (iv) historical user content recommendation information for each of the plurality of users;

training, by a server computing device in communication with the computer data store, a layout selection model comprising (i) a prescriptive machine learning (ML) model that generates a plurality of digital content layouts each comprising a plurality of digital content item slots arranged according to one or more digital content selection constraints and (ii) a predictive ML model that generates a predicted likelihood of user interaction with one or more of the plurality of digital content items, wherein the predictive ML model is trained based on the historical user interaction information and the historical user content recommendation information;

receiving, by the server computing device, user profile information for a first user from the computer data store;

executing, by the server computing device, the trained layout selection model using as input the user profile information, the plurality of digital content layouts, and the plurality of digital content items to generate a plurality of digital content item displays, each including a selected digital content item placed in each slot, wherein the trained ML selection model executes a prescriptive ML model to generate the plurality of digital content item displays while executing the predictive ML model in parallel to generate the interaction prediction scores for the plurality of digital content items, and the trained layout selection model integrates the separate output from each of the prescriptive ML model and the predictive ML model together to generate the customized digital content item display for the user;

determining, by the server computing device for each digital content item display, an interaction prediction score for each digital content item in the display;

selecting, by the server computing device, a digital content item display based upon the interaction predictions scores; and transmitting, by the server computing device, the selected digital content item display to a client computing device.

12. The method of claim 11, wherein the plurality of digital content items comprise one or more of text articles, content cards, or website messages.

13. The method of claim 11, wherein each digital content item slot in the digital content layout is assigned to a topic.

14. The method of claim 11, wherein the digital content selection constraints comprise a maximum number of digital content items selected for one or more topics, a maximum number of digital content items available for each topic, a maximum number of selected topics, and a ranking of selected topics.

15. The method of claim 14, wherein the interaction prediction score for each digital content item corresponds to a likelihood of a user interaction with the digital content item.

16. The method of claim 15, wherein the user interaction with the digital content item comprises a click on the digital content item.

17. The method of claim 11, wherein, upon transmitting the selected digital content item display to the client computing device, the server computing device updates the historical user content recommendation information in the computer data store based upon the digital content items in the selected digital content item display.

18. The method of claim 17, wherein the server computing device receives indicia of an interaction with one of the digital content items in the digital content item display at the client computing device, and updates the historical user interaction information in the computer data store based upon the indicia.

19. The method of claim 18, wherein the server computing device retrains the trained ML recommendation model based upon the updated historical user content recommendation information and the updated historical user interaction information.

20. The method of claim 11, wherein the server computing device receives the digital content selection constraints from a user of a remote computing device.

* * * * *